(12) United States Patent
Yu et al.

(10) Patent No.: US 12,113,694 B2
(45) Date of Patent: Oct. 8, 2024

(54) SCREEN PROJECTION DATA TRANSMISSION METHOD AND APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventors: Zhenhua Yu, Beijing (CN); Xianchao Shen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/549,068

(22) PCT Filed: Sep. 19, 2022

(86) PCT No.: PCT/CN2022/119533
§ 371 (c)(1),
(2) Date: Sep. 5, 2023

(87) PCT Pub. No.: WO2023/071605
PCT Pub. Date: May 4, 2023

(65) Prior Publication Data
US 2024/0171492 A1 May 23, 2024

(30) Foreign Application Priority Data
Oct. 25, 2021 (CN) .......................... 202111242981.7

(51) Int. Cl.
*H04L 43/0894* (2022.01)
*H04L 43/0829* (2022.01)
(52) U.S. Cl.
CPC ...... *H04L 43/0894* (2013.01); *H04L 43/0841* (2013.01)

(58) Field of Classification Search
None
See application file for complete search history.

(56) References Cited

U.S. PATENT DOCUMENTS

2013/0195119 A1* 8/2013 Huang .................... H04L 69/22
370/468
2017/0094286 A1 3/2017 Gu
(Continued)

FOREIGN PATENT DOCUMENTS

CN 108769716 A 11/2018
CN 109729439 A 5/2019
(Continued)

OTHER PUBLICATIONS

International Search Report (with English translation) and Written Opinion issued in PCT/CN2022/079383, dated May 17, 2022, 10 pages provided.
(Continued)

*Primary Examiner* — June Sison
(74) *Attorney, Agent, or Firm* — HSML P. C.

(57) ABSTRACT

Provided are a screen casting data transmission method and apparatus, an electronic device and a storage medium. The screen casting data transmission method includes: receiving feedback information which is sent by a target data reception terminal according to received screen casting data, and determining a data round-trip time of the screen casting data according to information content of a preset data transmission field in transmission control protocol (TCP) header information in the feedback information; estimating a network bandwidth according to a value change of the data round-trip time, and determining an adjustment strategy for a screen casting data encoding parameter based on a network bandwidth estimation result and a current data sending bandwidth; and adjusting the screen casting data encoding
(Continued)

Receive feedback information which is sent by a target data reception terminal according to received screen casting data, and determine a data round-trip time of the screen casting data according to information content of a preset data transmission field in TCP header information in the feedback information — S110

Estimate a network bandwidth according to a value change of the data round-trip time, and determine an adjustment strategy for a screen casting data encoding parameter based on a network bandwidth estimation result and a current data sending bandwidth — S120

Adjust the screen casting data encoding parameter according to the adjustment strategy, encode the to-be-sent screen casting data according to the adjusted encoding parameter, and complete data transmission — S130 parameter, encoding to-be-sent screen casting data according to the adjusted encoding parameter, and performing transmission.

20 Claims, 3 Drawing Sheets

(56) References Cited

U.S. PATENT DOCUMENTS

| | | |
|---|---|---|
| 2017/0094294 A1 | 3/2017 | Gu |
| 2017/0094296 A1 | 3/2017 | Gu |
| 2017/0123751 A1 | 5/2017 | Sigurdsson et al. |
| 2018/0285054 A1 | 10/2018 | Kim |
| 2019/0089760 A1* | 3/2019 | Zhang ............ H04L 65/70 |
| 2023/0319186 A1* | 10/2023 | Lesko ............ G06F 9/451 |
| | | 379/265.06 |
| 2023/0319917 A1* | 10/2023 | Hulse ............ H04W 76/14 |
| | | 370/329 |
| 2024/0045641 A1* | 2/2024 | Xu ............ H04L 65/403 |

FOREIGN PATENT DOCUMENTS

| | | |
|---|---|---|
| CN | 109819322 A | 5/2019 |
| CN | 110602548 A | 12/2019 |
| CN | 111741248 A | 10/2020 |
| CN | 111836079 A | 10/2020 |
| CN | 112203138 A | 1/2021 |
| CN | 112312137 A | 2/2021 |
| CN | 113038180 A | 6/2021 |
| CN | 113259760 A | 8/2021 |

OTHER PUBLICATIONS

Chinese Office Action, issued in Chinese patent application No. 202111242981.7, dated May 19, 2022, 8 pages (translation enclosed).
The supplemental European search report issued in European Application No. 22885492.3, dated Aug. 12, 2024.

* cited by examiner

SCREEN PROJECTION DATA TRANSMISSION METHOD AND APPARATUS, ELECTRONIC DEVICE, AND STORAGE MEDIUM

CROSS-REFERENCE TO RELATED APPLICATIONS

This is a national stage application filed under 37 U.S.C. 371 based on International Patent Application No. PCT/CN2022/119533, filed Sep. 19, 2022, which claims priority to Chinese Patent Application No. 202111242981.7 filed with the China National Intellectual Property Administration (CNIPA) on Oct. 25, 2021, the disclosures of which are incorporated herein by reference their entireties.

TECHNICAL FIELD

The present disclosure relates to the field of computer technologies, for example, a screen casting data transmission method and apparatus, an electronic device and a storage medium.

BACKGROUND

Generally, the transmission of screen casting data between a screen casting data source terminal and a video playing terminal is performed in wireless local area networks. During the data transmission process, network instability such as latency, jitter and packet loss may occur, which can cause video choppiness or even screen casting interruption, giving users a very poor experience.

In the related art, to dynamically monitor the network status and control the transmission process of screen casting data, a data transmission manner based on the user datagram protocol (UDP) is usually adopted. However, from the perspective of application developers, the application developers may prioritize data transmission based on the transmission control protocol (TCP), which can achieve more stable data transmission and thus bring a greater input-output ratio in terms of device operating costs. However, data transmission based on the TCP cannot perceive the network status and control the transmission process of screen casting data according to the traditional packet loss rate and the retransmission rate to improve the video viewing experience of users who perform screen casting.

SUMMARY

The present disclosure provides a screen casting data transmission method and apparatus, an electronic device and a storage medium, so that the viewing experience of the user for a screen-casted video can be improved.

The present disclosure provides a screen casting data transmission method. The method includes steps described below.

Feedback information which is sent by a target data reception terminal according to received screen casting data is received, and a data round-trip time of the screen casting data is determined according to information content of a preset data transmission field in TCP header information in the feedback information.

A network bandwidth is estimated according to a value change of the data round-trip time, and an adjustment strategy for a screen casting data encoding parameter is determined based on a network bandwidth estimation result and a current data sending bandwidth.

The screen casting data encoding parameter is adjusted according to the adjustment strategy, to-be-sent screen casting data is encoded according to the adjusted encoding parameter, and data transmission is completed.

The present disclosure further provides a screen casting data transmission apparatus. The apparatus includes a data transmission monitoring module, a data encoding control module and a data encoding and transmission module.

The data transmission monitoring module is configured to receive feedback information which is sent by a target data reception terminal according to received screen casting data, and determine a data round-trip time of the screen casting data according to information content of a preset data transmission field in TCP header information in the feedback information.

The data encoding control module is configured to estimate a network bandwidth according to a value change of the data round-trip time, and determine an adjustment strategy for a screen casting data encoding parameter based on a network bandwidth estimation result and a current data sending bandwidth.

The data encoding and transmission module is configured to adjust the screen casting data encoding parameter according to the adjustment strategy, encode to-be-sent screen casting data according to the adjusted encoding parameter, and complete data transmission.

The present disclosure further provides an electronic device. The electronic device includes one or more processors and a storage apparatus configured to store one or more programs.

The one or more programs, when executed by the one or more processors, cause the one or more processors to perform the preceding screen casting data transmission method.

The present disclosure further provides a storage medium including a computer-executable instruction, where the computer-executable instruction, when executed by a computer processor, are configured to execute the preceding screen casting data transmission method.

DETAILED DESCRIPTION

Embodiments of the present disclosure are described hereinafter with reference to the drawings. The drawings illustrate some embodiments of the present disclosure, but the present disclosure may be implemented in various manners. These embodiments are provided for ease of understanding of the present disclosure. The drawings and embodiments of the present disclosure are illustrative.

Steps described in method embodiments of the present disclosure may be performed in sequence and/or in parallel. Additionally, the method embodiments may include additional steps and/or omit some of the illustrated steps. The scope of the present disclosure is not limited in this respect.

The term "includes" or its variant used herein means "includes, but is not limited to". The term "based on" means "at least partially based on". The term "an embodiment" means "at least one embodiment". The term "another embodiment" means "at least another embodiment". The term "some embodiments" means "at least some embodiments". Definitions of other terms are given in the description hereinafter.

Concepts such as "first" and "second" mentioned in the present disclosure are used for distinguishing between apparatuses, between modules or between units and are not intended to limit the order or mutual dependence of the functions performed by these apparatuses, modules or units.

"One" and "multiple" mentioned in the present disclosure are not limiting but illustrative. It is to be understood by those skilled in the art that "one" and "multiple" are construed as "one or more" unless otherwise specified in the context.

Embodiment One

Figure 1:
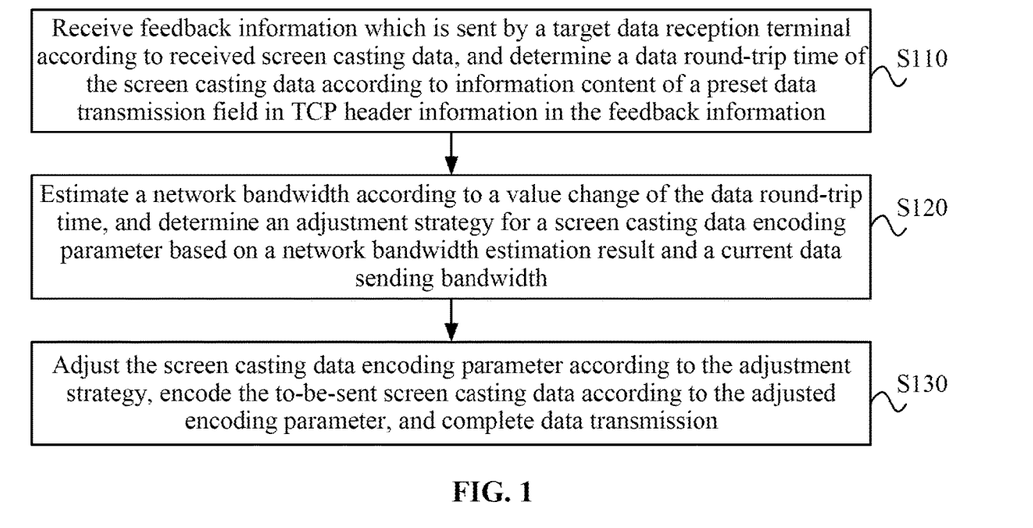
FIG. 1 is a flowchart of a screen casting data transmission method according to embodiment one of the present disclosure.

FIG. 1 is a flowchart of a screen casting data transmission method according to embodiment one of the present disclosure. The embodiment of the present disclosure is applicable to the case of monitoring the transmission process of screen casting data. The method may be executed by a screen casting data transmission apparatus, which may be implemented in the form of software and/or hardware, and may be configured in an electronic device, such as a mobile terminal or a server device.

As shown in FIG. 1, the screen casting data transmission method provided in the embodiment includes steps described below.

In S110, feedback information which is sent by a target data reception terminal according to received screen casting data is received, and a data round-trip time of the screen casting data is determined according to information content of a preset data transmission field in TCP header information in the feedback information.

In the scenario of screen casting data transmission, the target data reception terminal is a screen casting data display device, the target data reception terminal and a screen casting source terminal may establish a communication channel based on a preset communication protocol, and the screen casting data sent by the screen casting source terminal is received through the communication channel. In the embodiment, the communication protocol of the screen casting source terminal and the target data reception terminal is the TCP. After receiving the screen casting data, the target data reception terminal further sends the feedback information to notify the screen casting source terminal of successful reception of the corresponding screen casting data.

When the screen casting source terminal and the target data reception terminal perform the operation of multiple stages such as connection, transceiving and disconnection, data of interaction between the two parties are packaged into data packets for transmission. A data packet is composed of two parts, that is, a header and data. The header contains communication control information such as a data sending destination, and the data refers to data content to be sent by a data sender to a data receiver. In the embodiment, a preset data transmission field is set in the TCP header information, and the field may be named as a PAYLOAD field. In this field, more information of the sent screen casting data can be displayed. Exemplarily, in the PAYLOAD field, the zeroth byte donates video data, the first byte denotes audio data, the second byte denotes a first count value representing sending of the screen casting data, and the third byte denotes a second count value representing reception feedback of the screen casting data. The first count value and the second count value are used for determining the data round-trip time (RTT), that is, a data round-trip delay, of the sent screen casting data.

When sending data, the screen casting source terminal may write a data packet count value at the position of the first count value, which represents sending of the screen casting data, of the preset data transmission field. The count value generally starts from 1, and the second count value field is empty. After receiving the data packet from the screen casting source terminal, when sending reception confirmation feedback information, the target data reception terminal writes the same value as the first count value at the position of the second count value of the preset data transmission field. When receiving the feedback information which is sent by the target data reception terminal according to the received screen casting data, the screen casting source terminal may parse the information of the preset data transmission field in the TCP header of the feedback information and identify the first count value representing sending of the screen casting data and the second count value representing the reception feedback of the screen casting data in the preset data transmission field. When the first count value and the second count value are the same, the data round-trip time of the screen casting data is determined according to a sending moment of the screen casting data and a reception moment when the feedback information is received.

In S120, a network bandwidth is estimated according to a value change of the data round-trip time, and an adjustment strategy for a screen casting data encoding parameter is determined according to a network bandwidth estimation result and a current data sending bandwidth.

A network bandwidth refers to the maximum data rate allowed between the screen casting source terminal and the target data reception terminal in a unit time. Estimating the network bandwidth may mean determining a change trend of the network bandwidth in the following time. The network bandwidth and the data round-trip time have opposite change trends. As the data round-trip time increases, the network bandwidth decreases. The higher the degree to which the data round-trip time increases, the higher the degree to which the network bandwidth decreases. Therefore, the screen casing data encoding parameter may be adjusted according to the estimated change trend of the network bandwidth such that the occupation of the network bandwidth by to-be-sent data is reduced, and thus the choppiness in the display of the screen casting data is reduced.

The current data sending bandwidth refers to a data sending bandwidth when the screen casting data corresponding to the received feedback information is sent. During the process of sending the screen casting data, a time for calling a data sending interface and sending the screen casting data may be timed so that screen casting data sending duration is determined. Then, the current data sending bandwidth is determined according to the screen casting data sending duration and a data volume of the screen casting data. For example, the current data sending bandwidth may be determined by dividing the data volume of the screen casting data by the screen casting data sending duration.

Generally, the controllable screen casting data encoding parameter includes a data encoding bitrate, a frame rate, encoding resolution, etc. The bitrate refers to the size of data encoded by an encoder per second, in kilobits per second (kbps). For example, 800 kbps represents that the encoder generates data of 800 kb (or 100 kilobytes (KB)) per second. The frame rate refers to the number of image frames played per second. The encoding resolution refers to the number of pixels contained per unit inch of an image. The adjustment strategy for the screen casting data encoding parameter refers to different parameter adjustment manners formulated according to the estimated change degree of the network bandwidth. For example, without affecting the ultimate subjective sharpness experience and fluency experience of the user, for example, the frame rate is not less than 30 frames per second, and priority for parameter adjustment may be set. When the estimated decrease degree of the network bandwidth is relatively low, the adjustment of the data encoding bitrate may be prioritized; when the estimated decrease degree of the network bandwidth is relatively high, the encoding bitrate and the resolution may be adjusted simultaneously, so that the effect of reducing bandwidth occupation is achieved, and the choppiness of the screen-casted video is reduced. For a value to which each parameter is adjusted, a correlation function relationship between parameter values and network bandwidth change values may be pre-established, and a value to which a parameter is adjusted is determined according to the function relationship. The prerequisite for adopting the preceding adjustment strategy is that the current data sending bandwidth is greater than or equal to the unadjusted current data encoding bitrate. When the current data sending bandwidth is less than the unadjusted current data encoding bitrate, encoding of to-be-sent screen casting data is directly suspended until sending of all data in a data sending buffer queue is completed and the network bandwidth recovers to a normal status. This is because in this network status, requirements for the network bandwidth cannot be satisfied even if the data encoding parameter is adjusted.

In S130, the screen casting data encoding parameter is adjusted according to the adjustment strategy, the to-be-sent screen casting data is encoded according to the adjusted encoding parameter, and data transmission is completed.

After the adjustment strategy for the data encoding parameter is determined, the adjusted new data encoding parameter is used for encoding screen casting data that has not yet been encoded, and the screen casting data is sent to the target data reception terminal after being encoded. In each data packet of sent data, corresponding information is written in the preset data transmission field in the TCP header information of the data packet. The corresponding information includes the first count value for representing data sending and calculating the RTT. In this manner, the screen casting source terminal can continuously observe RTT values according to the received feedback information, estimate the network bandwidth and adjust the screen casting data encoding parameter in time, so that problems occurring during screen casting and caused by uncontrollable sudden network instability can be quickly solved, occurrence of screen casting choppiness or even interruption is reduced, and the user experience is improved.

According to the technical solutions of the embodiment of the present disclosure, in the process of screen casting data transmission, when the feedback information which is sent by the target data reception terminal according to the received screen casting data is received, the data round-trip time of each screen casting data packet is determined according to the information content of the preset data transmission field in the TCP header information in the feedback information: then the network bandwidth is estimated according to the value change of the data round-trip time, and the adjustment strategy for the screen casting data encoding parameter is determined according to the network bandwidth estimation result and the current data sending bandwidth: the screen casting data encoding parameter is adjusted according to the determined adjustment strategy, the to-be-sent screen casting data is encoded according to the adjusted encoding parameter, and data transmission is completed. According to the technical solutions of the embodiment of the present disclosure, the problem that the network status cannot be directly monitored to control the screen casting data transmission process in the data transmission process based on the TCP is solved, the network status between two parties performing screen casting data interaction based on the TCP is monitored, and the strategy for the screen casting data encoding is adjusted according to the network status and screen casting data transmission is performed, so that video choppiness and video freezing caused by the network problem in the screen casting process are reduced, and the viewing experience of the user for the screen-casted video is improved.

Embodiment Two

The embodiment of the present disclosure may be combined with multiple solutions in the screen casting data transmission method provided in the preceding embodiment. The screen casting data transmission method provided in the embodiment describes the complete process of screen casting data transmission and the strategy for screen casting parameter adjustment.

Figure 2:
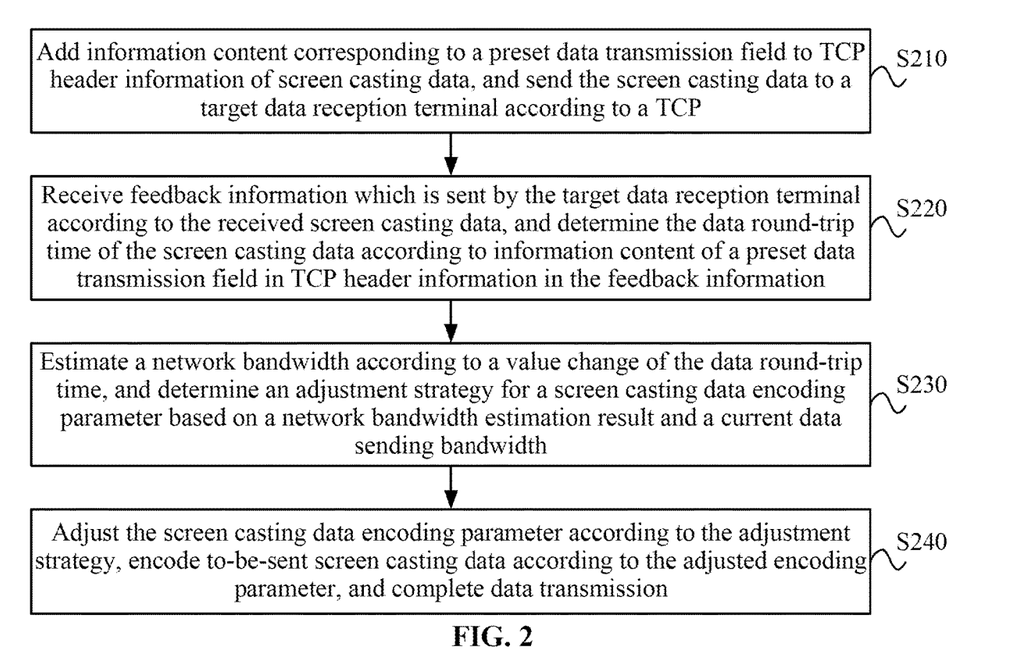
FIG. 2 is a flowchart of a screen casting data transmission method according to embodiment two of the present disclosure.

FIG. 2 is a flowchart of a screen casting data transmission method according to embodiment two of the present disclosure. As shown in FIG. 2, the screen casting data transmission method provided in the embodiment includes steps described below:

In S210, information content corresponding to a preset data transmission field is added to TCP header information of screen casting data, and the screen casting data is sent to a target data reception terminal according to a TCP.

Figure 3:
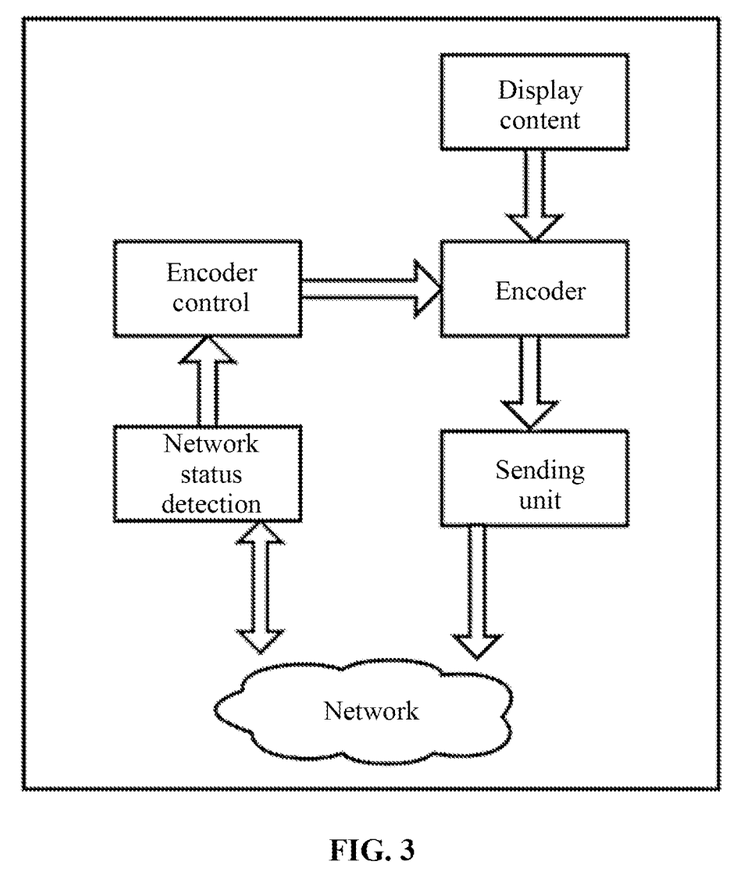
FIG. 3 is a diagram of a screen casting data transmission process according to embodiment two of the present disclosure.

For the complete process for achieving screen casting, reference may be made to the screen casting data transmission process shown in FIG. 3. The display content in FIG. 3 is the content to be displayed through a screen casting display device. After being encoded by an encoder, the display content is packaged by a sending unit, and communication control information such as a sending destination is added to data packets as TCP header information, thus forming the screen casting data sent by a screen casting source terminal. The sending unit of the screen casting source terminal establishes a network connection with the target data reception terminal through the network and the TCP, and sends the screen casting data to the target data reception terminal.

In the embodiment, a preset data transmission field is set in the TCP header information, and information in the field is used as reference for determining an RTT of the screen casting data. Exemplarily, two bytes are included in the preset data transmission field. One byte is used for recording a first count value representing sending of the screen casting data, and the other byte is used for denoting a second count value representing reception feedback of the screen casting data. Determined count information is written to the first count value during data packaging by the sending unit, while the second count value is empty.

In S220, feedback information which is sent by the target data reception terminal according to the received screen casting data is received, and the data round-trip time of the screen casting data is determined according to information content of a preset data transmission field in TCP header information in the feedback information.

After receiving the screen casting data, the target data reception terminal may send the feedback information based on a network channel established with the screen casting source terminal to notify the screen casting source terminal of successful reception of the corresponding screen casting data. Moreover, the TCP header information of the feedback information has the same preset data transmission field, and information of the second count value is written according to the first count value of the TCP header information of the screen casting data. For a data packet of the screen casting data, the first count value and the second count value are generally the same value, counting from 1.

Thus, the screen casting source terminal can detect the network status of the screen casting source terminal and the network status of the target data reception terminal according to the received feedback information. In an implementation, when receiving the feedback information which is sent by the target data reception terminal according to the received screen casting data, the screen casting source terminal can parse the information of the preset data transmission field in the TCP header of the feedback information and identify the first count value representing sending of the screen casting data and the second count value representing the reception feedback of the screen casting data in the preset data transmission field. When the first count value and the second count value are the same, the data round-trip time of the screen casting data is determined according to a sending moment of the screen casting data and a reception moment when the feedback information is received.

In S230, a network bandwidth is estimated according to a value change of the data round-trip time, and an adjustment strategy for a screen casting data encoding parameter is determined according to a network bandwidth estimation result and a current data sending bandwidth.

Referring to FIG. 3, FIG. 3 shows a process of the screen casting source terminal performing encoder control on the encoder by adopting a corresponding adjustment strategy for the screen casting data encoding parameter after detecting the network status.

The network bandwidth and the data round-trip time have opposite change trends. As the data round-trip time increases, the network bandwidth decreases. The higher the degree to which the data round-trip time increases, the higher the degree to which the network bandwidth decreases. Therefore, the change trend of the network bandwidth can be reflected by the change degree of the RTT value.

Generally, the RTT value obtained through parsing by the screen casting source terminal is a relatively fixed and stable value. For example, in a common local area network of Wi-Fi, the RTT value is within 5 milliseconds (ms). When the RTT value remains stable and unchanged, and the calculated current sending bandwidth is consistent with a current data encoding bitrate, the encoding parameter of the encoder is not adjusted temporarily.

The adjustment strategy for the screen casting data encoding parameter may be different parameter adjustment schemes specified according to an estimated change trend of the network bandwidth, that is, the corresponding change degree of the RTT value. Multiple adjustment strategies are set without affecting the ultimate subjective sharpness experience and fluency experience of the user.

For ease of description, the change of the RTT value is directly used for representing the change of the network bandwidth. Exemplarily, in some implementations, when the RRT value starts to increase and the current data sending bandwidth is still consistent with the current data encoding bitrate, the adjustment of the data encoding bitrate is prioritized, and the value of resolution and the value of a frame rate are not adjusted temporarily. For example, the resolution of the screen casting data is 1920×1080 and the uplink bandwidth (that is, the current data sending bandwidth) is 12 megabits per second (Mbps), during the screen casting process, when the RTT value increases to twice the stable value, the data encoding bitrate of the encoder is controlled to decrease to half of the original sending bandwidth, that is, 6 Mbps, and the resolution and the frame rate are not adjusted. When the change degree of the RTT value increases and the RRT value continues to increase to three times the stable value, the resolution is reduced to 1280× 720, the frame rate remains unchanged, and the bitrate is adjusted to 5 Mbps. When the calculated current data sending bandwidth is less than the current data encoding bitrate, encoding of the display content is suspended until sending of a sending buffer queue of the sending unit is completed.

When the RTT value starts to decrease, it is indicated that the network bandwidth is recovering or increasing, and then the value of the encoding bitrate, the value of the resolution and the value of the frame rate are increased. For a value to which each parameter is adjusted, reference may be made to the encoding parameter reference table shown in Table 1. Each value in Table 1 is a parameter configuration result determined according to experience or test results.

TABLE 1

| Actual sending bitrate (bits per second (bps)) | RTT (ms) | Preset bitrate (bps) | Resolution | Frame rate (frames per second (fps)) |
|---|---|---|---|---|
| 3500 | 20 | 3500 | 1280 × 720 | 30 |
| 5000 | 15 | 5000 | 1280 × 720 | 30 |
| 6000 | 10 | 6000 | 1920 × 1080 | 60 |
| 12000 | 5 | 12000 | 1920 × 1080 | 60 |
| 15000 | 5 | 15000 | 2560 × 1440 | 60 |
| 18000 | 5 | 18000 | 2560 × 1440 | 60 |

The data table shown in Table 1 includes a total of five data items including the actual sending bitrate, the RTT, the preset bitrate, the resolution and the frame rate. The actual sending bitrate is the unadjusted current data encoding bitrate, and the preset bitrate is a target value to which the data encoding bitrate is to be adjusted. When the actual sending bitrate is the same as the preset bitrate, the data encoding parameter is not adjusted. When the actual sending rate is inconsistent with the preset bitrate, each parameter value of the encoding parameter is adjusted to the corresponding parameter value of the preset bitrate.

When the adjustment strategy for the encoding parameter is determined, reference may further be made to parameter relationships under different encoding and compression manners. For example, a relationship between the data encoding bitrate, the resolution and the frame rate may be expressed as the following: data encoding bitrate= resolution*frame rate*A, where parameter A represents a compression rate; for example, when the compression standard of H.264 or the compression standard of Moving Picture Experts Group (MPEG)-2 is used, the compression rate is different. A is not a fixed parameter and may be adjusted: however, the adjustment needs to be performed within a range such as 5 to 20. Therefore, in certain cases, the resolution and the frame rate need to be reduced so that the bitrate is reduced.

In S240, the screen casting data encoding parameter is adjusted according to the adjustment strategy, to-be-sent screen casting data is encoded according to the adjusted encoding parameter, and data transmission is completed.

The technical solutions of the embodiment of the present disclosure describe the complete screen casting data transmission process based on the preceding embodiment. In the process of screen casting data transmission, when the feedback information which is sent by the target data reception terminal according to the received screen casting data is received, the data round-trip time of each screen casting data packet is determined according to the information content of the preset data transmission field in the TCP header information in the feedback information: then the network bandwidth is estimated according to the value change of the data round-trip time, and the adjustment strategy for the screen casting data encoding parameter is determined according to the network bandwidth estimation result and the current data sending bandwidth, where the adjustment strategy is illustrated through examples: the screen casting data encoding parameter is adjusted according to the determined adjustment strategy, and the to-be-sent screen casting data is encoded according to the adjusted encoding parameter and data transmission is completed. According to the technical solutions of the embodiment of the present disclosure, the problem that the network status cannot be directly monitored to control the screen casting data transmission process in the data transmission process based on the TCP is solved, the network status between two parties performing screen casting data interaction based on the TCP is monitored, and the strategy for the screen casting data encoding is adjusted according to the network status and screen casting data transmission is performed, so that video choppiness and video freezing caused by the network problem in the screen casting process are reduced, and the viewing experience of the user for the screen-casted video is improved.

Embodiment Three

Figure 4:
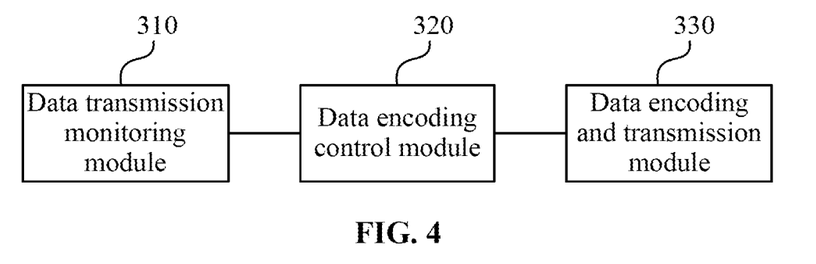
FIG. 4 is a structural diagram of a screen casting data transmission apparatus according to embodiment three of the present disclosure.

FIG. 4 is a structural diagram of a screen casting data transmission apparatus according to embodiment three of the present disclosure. The screen casting data transmission apparatus provided in the embodiment is applicable to the case of monitoring the transmission process of screen casting data.

As shown in FIG. 4, the screen casting data transmission apparatus includes a data transmission monitoring module 310, a data encoding control module 320 and a data encoding and transmission module 330.

The data transmission monitoring module 310 is configured to receive feedback information which is sent by a target data reception terminal according to received screen casting data, and determine a data round-trip time of the screen casting data according to information content of a preset data transmission field in TCP header information in the feedback information. The data encoding control module 320 is configured to estimate a network bandwidth according to a value change of the data round-trip time, and determine an adjustment strategy for a screen casting data encoding parameter based on a network bandwidth estimation result and a current data sending bandwidth. The data encoding and transmission module 330 is configured to adjust the screen casting data encoding parameter according to the adjustment strategy, encode to-be-sent screen casting data according to the adjusted encoding parameter, and complete data transmission.

According to the technical solutions of the embodiment of the present disclosure, in the process of screen casting data transmission, when the feedback information which is sent by the target data reception terminal according to the received screen casting data is received, the data round-trip time of each screen casting data packet is determined according to the information content of the preset data transmission field in the TCP header information in the feedback information: then the network bandwidth is estimated according to the value change of the data round-trip time, and the adjustment strategy for the screen casting data encoding parameter is determined based on the network bandwidth estimation result and the current data sending bandwidth: the screen casting data encoding parameter is adjusted according to the determined adjustment strategy, the to-be-sent screen casting data is encoded according to the adjusted encoding parameter, and data transmission is completed. According to the technical solutions of the embodiment of the present disclosure, the problem that the network status cannot be directly monitored to control the screen casting data transmission process in the data transmission process based on the TCP is solved, the network status between two parties performing screen casting data interaction based on the TCP is monitored, and the strategy for the screen casting data encoding is adjusted according to the network status and screen casting data transmission is performed, so that video choppiness and video freezing caused by the network problem in the screen casting process are reduced, and the viewing experience of the user for the screen-casted video is improved.

In some implementations, the data encoding and transmission module 330 is further configured to, before the feedback information is received, add information content corresponding to a preset data transmission field to TCP header information of the screen casting data, and send the screen casting data to the target data reception terminal according to TCP.

In some implementations, the data transmission monitoring module 310 is configured to identify a first count value and a second count value in the preset data transmission field: and when the first count value and the second count value are the same, determine the data round-trip time of the screen casting data according to a sending moment of the screen casting data and a reception moment when the feedback information is received.

In some implementations, the data transmission monitoring module 310 may further be configured to, in a process of sending the screen casting data, time a time for calling a data sending interface and sending the screen casting data to determine screen casting data sending duration; and determine the current data sending bandwidth according to the screen casting data sending duration and a data volume of the screen casting data.

In some implementations, the data encoding control module 320 is configured to estimate a change degree of the network bandwidth according to a change degree of the data round-trip time; and when the current data sending bandwidth is greater than or equal to a current data encoding bitrate, match a corresponding preset screen casting data encoding parameter adjustment strategy according to the change degree of the network bandwidth.

In some implementations, the screen casting data encoding parameter includes a data encoding bitrate, resolution and a frame rate, and in the preset screen casting data encoding parameter adjustment strategy, priority of adjusting the data encoding bitrate is higher than priority of adjusting the resolution and/or priority of adjusting the frame rate.

In some implementations, the data encoding and transmission module 330 is further configured to, when the current data sending bandwidth is less than the current data encoding bitrate, suspend encoding of the to-be-sent screen casting data until sending of encoded screen casting data in a screen casting data sending buffer queue is completed.

The screen casting data transmission apparatus provided in the embodiment of the present disclosure may execute the screen casting data transmission method according to any embodiment of the present disclosure, and has functional modules for and effects of executing the method.

The multiple units and modules included in the preceding apparatus are just divided according to function logic. These units and modules may also be divided in other manners as long as the corresponding functions can be implemented. Additionally, names of functional units are used for distinguishing between these function units and are not intended to limit the protection scope of the embodiment of the present disclosure.

Embodiment Four

Figure 5:
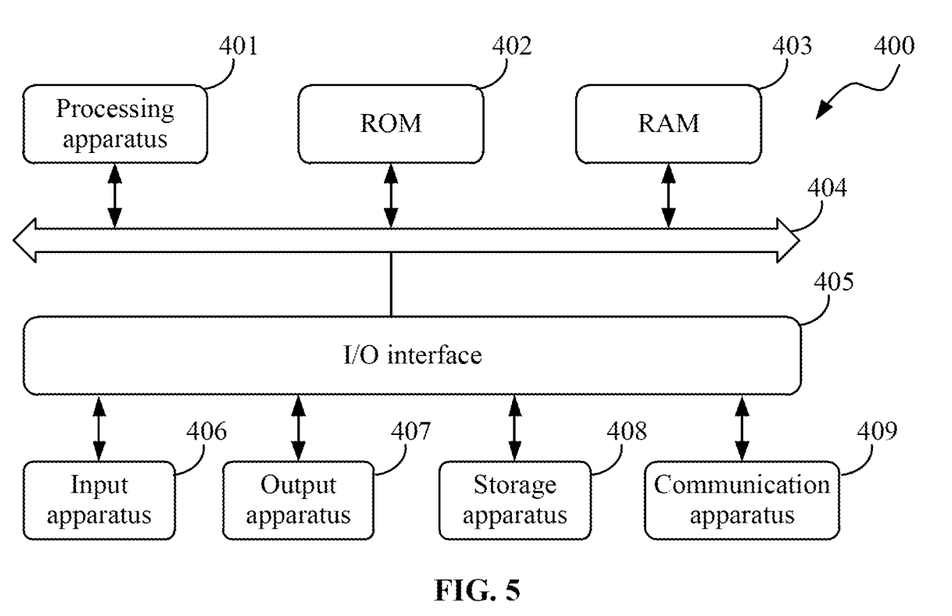
FIG. 5 is a structural diagram of an electronic device according to embodiment four of the present disclosure.

FIG. 5 is a structural diagram of an electronic device 400 (such as a terminal device or a server in FIG. 5) applicable to implementing the embodiments of the present disclosure. The terminal device 400 in the embodiment of the present disclosure may include, but is not limited to, mobile terminals such as a mobile phone, a laptop, a digital broadcast receiver, a personal digital assistant (PDA), a portable Android device (PAD), a portable media player (PMP) and a vehicle-mounted terminal (such as a vehicle-mounted navigation terminal), and fixed terminals such as a digital television (TV) and a desktop computer. The electronic device 400 shown in FIG. 5 is merely an example and is not intended to limit the function and use scope of the embodiments of the present disclosure.

As shown in FIG. 5, the electronic device 400 may include a processing apparatus 401 (such as a central processing unit or a graphics processing unit). The processing apparatus 401 may perform various types of appropriate operations and processing according to a program stored in a read-only memory (ROM) 402 or a program loaded from a storage apparatus 408 to a random-access memory (RAM) 403. The RAM 403 also stores various programs and data required for the operation of the electronic device 400. The processing apparatus 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touchpad, a keyboard, a mouse, a camera, a microphone, an accelerometer and a gyroscope; an output apparatus 407 such as a liquid crystal display (LCD), a speaker and a vibrator; the storage apparatus 408 such as a magnetic tape and a hard disk; and a communication apparatus 409. The communication apparatus 409 may allow the electronic device 400 to perform wireless or wired communication with other devices to exchange data.

Although FIG. 5 shows the electronic device 400 having various apparatuses, it is not required to implement or include all the apparatuses shown. Alternatively, more or fewer apparatuses may be implemented.

According to the embodiments of the present disclosure, the processes described above with reference to the flowcharts may be implemented as computer software programs. For example, an embodiment of the present disclosure includes a computer program product. The computer program product includes a computer program carried on a non-transitory computer-readable medium. The computer program includes program codes for performing the method illustrated in the flowcharts. In such an embodiment, the computer program may be downloaded and installed from a network through the communication apparatus 409, installed from the storage apparatus 408, or installed from the ROM 402. When the computer program is executed by the processing apparatus 401, the preceding functions defined in the screen casting data transmission method of the embodiments of the present disclosure are performed.

The electronic device provided in the embodiment of the present disclosure belongs to the same concept as the screen casting data transmission method provided in the preceding embodiments. For the technical details not described in detail in the embodiment, reference may be made to the preceding embodiments, and the embodiment has the same beneficial effects as the preceding embodiments.

Embodiment Five

An embodiment of the present disclosure provides a computer storage medium storing a computer program which, when executed by a processor, performs the screen casting data transmission method provided in the preceding embodiments.

The preceding computer-readable medium of the present disclosure may be a computer-readable signal medium or a computer-readable storage medium or any combination thereof. For example, the computer-readable storage medium may be, but is not limited to, an electrical, magnetic, optical, electromagnetic, infrared or semiconductor system, apparatus or device or any combination thereof. Examples of the computer-readable storage medium may include, but are not limited to, an electrical connection with one or more wires, a portable computer disk, a hard disk, a RAM, a ROM, an erasable programmable read-only memory (EPROM), a flash memory, an optical fiber, a portable compact disc read-only memory (CD-ROM), an optical storage device, a magnetic storage device or any appropriate combination thereof. In the present disclosure, the computer-readable storage medium may be any tangible medium including or storing a program. The program may be used by or in conjunction with an instruction execution system, apparatus or device. In the present disclosure, the computer-readable signal medium may include a data signal propagated in the baseband or as part of a carrier wave, where computer-readable program codes are carried in the data signal. The data signal propagated in this manner may be in various forms, including, but not limited to, an electromagnetic signal, an optical signal or any appropriate combination thereof. The computer-readable signal medium may also be any computer-readable medium other than the computer-readable storage medium. The computer-readable signal medium may send, propagate or transmit a program used by or in conjunction with an instruction execution system, apparatus or device. Program codes included on the computer-readable medium may be transmitted by any appropriate medium, including, but not limited to, a wire, an optical cable, a radio frequency (RF) or any appropriate combination thereof.

In some embodiments, clients and servers may communicate using any network protocol currently known or to be developed future, such as HyperText Transfer Protocol (HTTP), and may be interconnected with any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or to be developed in the future.

The preceding computer-readable medium may be included in the preceding electronic device or may exist alone without being assembled into the electronic device.

The preceding computer-readable medium carries one or more programs which, when executed by the electronic device, cause the electronic device to: receive feedback information which is sent by a target data reception terminal according to received screen casting data, and determine a data round-trip time of the screen casting data according to information content of a preset data transmission field in TCP header information in the feedback information; estimate a network bandwidth according to a value change of the data round-trip time, and determine an adjustment strategy for a screen casting data encoding parameter based on a network bandwidth estimation result and a current data sending bandwidth; and adjust the screen casting data encoding parameter according to the adjustment strategy, encode to-be-sent screen casting data according to the adjusted screen casting data encoding parameter, and complete data transmission.

Computer program codes for executing operations in the present disclosure may be written in one or more programming languages or a combination thereof. The preceding programming languages include, but are not limited to, an object-oriented programming language such as Java, Smalltalk or C++ and may also include a conventional procedural programming language such as C or a similar programming language. The program codes may be executed entirely on a user computer, executed partly on a user computer, executed as a stand-alone software package, executed partly on a user computer and partly on a remote computer, or executed entirely on a remote computer or a server. In the case involving the remote computer, the remote computer may be connected to the user computer through any type of network, including a LAN or a WAN or may be connected to an external computer (for example, via the Internet provided by an Internet service provider).

The flowcharts and block diagrams in the drawings illustrate possible architectures, functions and operations of the system, method and computer program product according to the embodiments of the present disclosure. In this regard, each block in the flowcharts or block diagrams may represent a module, a program segment or part of codes. The module, program segment or part of codes contains one or more executable instructions for implementing specified logical functions. It is also to be noted that in some alternative implementations, the functions marked in the blocks may be implemented in an order different from those marked in the drawings. For example, two successive blocks may, in fact, be performed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The units involved in the embodiments of the present disclosure may be implemented by software or hardware. The name of a unit or module is not intended to limit the unit or module in a certain circumstance. For example, the data encoding and transmission module may also be described as "a module for adjusting the screen casting data encoding parameter according to the adjustment strategy, encoding to-be-sent screen casting data according to the adjusted screen casting data encoding parameter, and completing data transmission".

The functions described herein may be performed, at least partially, by one or more hardware logic components. For example, without limitation, example types of hardware logic components that can be used include a field-programmable gate array (FPGA), an application-specific integrated circuit (ASIC), an application-specific standard product (ASSP), a system-on-chip (SoC), a complex programmable logic device (CPLD) and the like.

In the context of the present disclosure, a machine-readable medium may be a tangible medium that may include or store a program used by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any appropriate combination thereof. Examples of the machine-readable storage medium include an electrical connection based on one or more wires, a portable computer disk, a hard disk, a RAM, a ROM, an EPROM, a flash memory, an optical fiber, a CD-ROM, an optical storage device, a magnetic storage device or any appropriate combination thereof.

According to one or more embodiments of the present disclosure, example one provides a screen casting data transmission method. The method includes steps described below.

Feedback information which is sent by a target data reception terminal according to received screen casting data is received, and a data round-trip time of the screen casting data is determined according to information content of a preset data transmission field in TCP header information in the feedback information.

A network bandwidth is estimated according to a value change of the data round-trip time, and an adjustment strategy for a screen casting data encoding parameter is determined based on a network bandwidth estimation result and a current data sending bandwidth.

The screen casting data encoding parameter is adjusted according to the adjustment strategy, to-be-sent screen casting data is encoded according to the adjusted encoding parameter, and data transmission is completed.

According to one or more embodiments of the present disclosure, example two provides a screen casting data transmission method. The method further includes the content described below.

In some implementations, before the feedback information is received, the method further includes the step described below.

Information content corresponding to a preset data transmission field is added to TCP header information of the screen casting data, and the screen casting data is sent to the target data reception terminal according to a TCP.

According to one or more embodiments of the present disclosure, example three provides a screen casting data transmission method. The method further includes the content described below.

In some implementations, the step in which the data round-trip time of the screen casting data is determined according to the information content of the preset data transmission field in the TCP header information in the feedback information includes steps described below.

A first count value and a second count value in the preset data transmission field are identified.

When the first count value and the second count value are the same, the data round-trip time of the screen casting data is determined according to a sending moment of the screen casting data and a reception moment when the feedback information is received.

According to one or more embodiments of the present disclosure, example four provides a screen casting data transmission method. The method further includes the content described below.

In some implementations, before the adjustment strategy for the screen casting data encoding parameter is determined, the method further includes steps described below.

In a process of sending the screen casting data, a time for calling a data sending interface and sending the screen casting data is timed so that screen casting data sending duration is determined.

The current data sending bandwidth is determined according to the screen casting data sending duration and a data volume of the screen casting data.

According to one or more embodiments of the present disclosure, example five provides a screen casting data transmission method. The method further includes the content described below.

In some implementations, the step in which the network bandwidth is estimated according to the value change of the data round-trip time, and the adjustment strategy for the screen casting data encoding parameter is determined based on the network bandwidth estimation result and the current data sending bandwidth includes steps described below.

A change degree of the network bandwidth is estimated according to a change degree of the data round-trip time.

When the current data sending bandwidth is greater than or equal to a current data encoding bitrate, a corresponding preset screen casting data encoding parameter adjustment strategy is matched according to the change degree of the network bandwidth.

According to one or more embodiments of the present disclosure, example six provides a screen casting data transmission method. The method further includes the content described below.

In some implementations, the screen casting data encoding parameter includes a data encoding bitrate, resolution and a frame rate, and in the preset screen casting data encoding parameter adjustment strategy, priority of adjusting the data encoding bitrate is higher than priority of adjusting the resolution and/or priority of adjusting the frame rate.

According to one or more embodiments of the present disclosure, example seven provides a screen casting data transmission method. The method further includes the content described below.

In some implementations, when the current data sending bandwidth is less than the current data encoding bitrate, encoding of the to-be-sent screen casting data is suspended until sending of encoded screen casting data in a screen casting data sending buffer queue is completed.

According to one or more embodiments of the present disclosure, example eight provides a screen casting data transmission apparatus. The apparatus includes a data transmission monitoring module, a data encoding control module and a data encoding and transmission module.

The data transmission monitoring module is configured to receive feedback information which is sent by a target data reception terminal according to received screen casting data, and determine a data round-trip time of the screen casting data according to information content of a preset data transmission field in TCP header information in the feedback information.

The data encoding control module is configured to estimate a network bandwidth according to a value change of the data round-trip time, and determine an adjustment strategy for a screen casting data encoding parameter based on a network bandwidth estimation result and a current data sending bandwidth.

The data encoding and transmission module is configured to adjust the screen casting data encoding parameter according to the adjustment strategy, encode to-be-sent screen casting data according to the adjusted encoding parameter, and complete data transmission.

According to one or more embodiments of the present disclosure, example nine provides a screen casting data transmission apparatus. The apparatus further involves the content described below.

In some implementations, the data encoding and transmission module is further configured to, before the feedback information is received, add information content corresponding to a preset data transmission field to TCP header information of the screen casting data, and send the screen casting data to the target data reception terminal according to TCP.

According to one or more embodiments of the present disclosure, example ten provides a screen casting data transmission apparatus. The apparatus further involves the content described below.

In some implementations, the data transmission monitoring module is configured to identify a first count value and a second count value in the preset data transmission field; and when the first count value and the second count value are the same, determine the data round-trip time of the screen casting data according to a sending moment of the screen casting data and a reception moment when the feedback information is received.

According to one or more embodiments of the present disclosure, example eleven provides a screen casting data transmission apparatus. The apparatus further involves the content described below.

In some implementations, the data transmission monitoring module may further be configured to, in a process of sending the screen casting data, time a time for calling a data sending interface and sending the screen casting data to determine screen casting data sending duration; and determine the current data sending bandwidth according to the screen casting data sending duration and a data volume of the screen casting data.

According to one or more embodiments of the present disclosure, example twelve provides a screen casting data transmission apparatus. The apparatus further involves the content described below.

In some implementations, the data encoding control module is configured to estimate a change degree of the network bandwidth according to a change degree of the data round-trip time; and when the current data sending bandwidth is greater than or equal to a current data encoding bitrate, match a corresponding preset screen casting data encoding parameter adjustment strategy according to the change degree of the network bandwidth.

According to one or more embodiments of the present disclosure, example thirteen provides a screen casting data transmission apparatus. The apparatus further involves the content described below.

In some implementations, the screen casting data encoding parameter includes a data encoding bitrate, resolution and a frame rate, and in the preset screen casting data encoding parameter adjustment strategy, priority of adjusting the data encoding bitrate is higher than priority of adjusting the resolution and/or priority of adjusting the frame rate.

According to one or more embodiments of the present disclosure, example fourteen provides a screen casting data transmission apparatus. The apparatus further involves the content described below.

In some implementations, the data encoding and transmission module is further configured to, when the current data sending bandwidth is less than the current data encoding bitrate, suspend encoding of the to-be-sent screen casting data until sending of encoded screen casting data in a screen casting data sending buffer queue is completed.

Additionally, although multiple operations are described in a particular order, it is not a must to perform these operations in this particular order or in a sequential order. In certain circumstances, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may also be implemented in multiple embodiments separately or in any appropriate sub-combination.

What is claimed is:

1. A screen casting data transmission method, comprising:
   receiving feedback information which is sent by a target data reception terminal according to received screen casting data, and determining a data round-trip time of the screen casting data according to information content of a preset data transmission field in transmission control protocol (TCP) header information in the feedback information;
   estimating a network bandwidth according to a value change of the data round-trip time, and determining an adjustment strategy for a screen casting data encoding parameter based on a network bandwidth estimation result and a current data sending bandwidth; and
   adjusting the screen casting data encoding parameter according to the adjustment strategy, encoding to-be-sent screen casting data according to the adjusted screen casting data encoding parameter, and completing data transmission.

2. The method according to claim 1, before receiving the feedback information, further comprising:
   adding information content corresponding to a preset data transmission field to TCP header information of the screen casting data, and sending the screen casting data to the target data reception terminal according to a TCP.

3. The method according to claim 1, wherein determining the data round-trip time of the screen casting data according to the information content of the preset data transmission field in the TCP header information in the feedback information comprises:
   identifying a first count value and a second count value in the preset data transmission field; and
   in a case where the first count value and the second count value are the same, determining the data round-trip time of the screen casting data according to a sending moment of the screen casting data and a reception moment when the feedback information is received.

4. The method according to claim 1, before determining the adjustment strategy for the screen casting data encoding parameter, further comprising:
   in a process of sending the screen casting data, timing a time for calling a data sending interface and sending the screen casting data to determine screen casting data sending duration; and
   determining the current data sending bandwidth according to the screen casting data sending duration and a data volume of the screen casting data.

5. The method according to claim 1, wherein estimating the network bandwidth according to the value change of the data round-trip time, and determining the adjustment strategy for the screen casting data encoding parameter based on the network bandwidth estimation result and the current data sending bandwidth comprises:
   estimating a change degree of the network bandwidth according to a change degree of the data round-trip time; and
   in a case where the current data sending bandwidth is greater than or equal to a current data encoding bitrate, matching a corresponding preset screen casting data encoding parameter adjustment strategy according to the change degree of the network bandwidth.

6. The method according to claim 5, wherein the screen casting data encoding parameter comprises a data encoding bitrate, resolution and a frame rate, and in the preset screen casting data encoding parameter adjustment strategy, priority of adjusting the data encoding bitrate is higher than at least one of priority of adjusting the resolution or priority of adjusting the frame rate.

7. The method according to claim 5, further comprising:
   in a case where the current data sending bandwidth is less than the current data encoding bitrate, suspending encoding of the to-be-sent screen casting data until sending of encoded screen casting data in a screen casting data sending buffer queue is completed.

8. An electronic device, comprising:
   at least one processor; and
   a storage apparatus configured to store at least one program;
   wherein the at least one program, when executed by the at least one processor, causes the at least one processor to perform:
   receiving feedback information which is sent by a target data reception terminal according to received screen casting data, and determining a data round-trip time of the screen casting data according to information content of a preset data transmission field in transmission control protocol (TCP) header information in the feedback information;
   estimating a network bandwidth according to a value change of the data round-trip time, and determining an adjustment strategy for a screen casting data encoding parameter based on a network bandwidth estimation result and a current data sending bandwidth; and
   adjusting the screen casting data encoding parameter according to the adjustment strategy, encoding to-besent screen casting data according to the adjusted screen casting data encoding parameter and completing data transmission.

9. A non-transitory storage medium comprising a computer-executable instruction, wherein the computer-executable instruction, when executed by a computer processor, is configured to execute:
   receiving feedback information which is sent by a target data reception terminal according to received screen casting data, and determining a data round-trip time of the screen casting data according to information content of a preset data transmission field in transmission control protocol (TCP) header information in the feedback information;
   estimating a network bandwidth according to a value change of the data round-trip time, and determining an adjustment strategy for a screen casting data encoding parameter based on a network bandwidth estimation result and a current data sending bandwidth; and
   adjusting the screen casting data encoding parameter according to the adjustment strategy, encoding to-be-sent screen casting data according to the adjusted screen casting data encoding parameter and completing data transmission.

10. The method according to claim 2, wherein determining the data round-trip time of the screen casting data according to the information content of the preset data transmission field in the TCP header information in the feedback information comprises:
    identifying a first count value and a second count value in the preset data transmission field; and
    in a case where the first count value and the second count value are the same, determining the data round-trip time of the screen casting data according to a sending moment of the screen casting data and a reception moment when the feedback information is received.

11. The electronic device according to claim 8, wherein the at least one program, when executed by the at least one processor, causes the at least one processor to, before performing receiving the feedback information, further perform:
    adding information content corresponding to a preset data transmission field to TCP header information of the screen casting data, and sending the screen casting data to the target data reception terminal according to a TCP.

12. The electronic device according to claim 8, wherein the at least one program, when executed by the at least one processor, causes the at least one processor to perform determining the data round-trip time of the screen casting data according to the information content of the preset data transmission field in the TCP header information in the feedback information in the following way:
    identifying a first count value and a second count value in the preset data transmission field; and
    in a case where the first count value and the second count value are the same, determining the data round-trip time of the screen casting data according to a sending moment of the screen casting data and a reception moment when the feedback information is received.

13. The electronic device according to claim 8, wherein the at least one program, when executed by the at least one processor, causes the at least one processor to, before performing determining the adjustment strategy for the screen casting data encoding parameter, further perform:
    in a process of sending the screen casting data, timing a time for calling a data sending interface and sending the screen casting data to determine screen casting data sending duration; and
    determining the current data sending bandwidth according to the screen casting data sending duration and a data volume of the screen casting data.

14. The electronic device according to claim 8, wherein the at least one program, when executed by the at least one processor, causes the at least one processor to perform estimating the network bandwidth according to the value change of the data round-trip time, and determining the adjustment strategy for the screen casting data encoding parameter based on the network bandwidth estimation result and the current data sending bandwidth in the following way:
    estimating a change degree of the network bandwidth according to a change degree of the data round-trip time; and
    in a case where the current data sending bandwidth is greater than or equal to a current data encoding bitrate, matching a corresponding preset screen casting data encoding parameter adjustment strategy according to the change degree of the network bandwidth.

15. The electronic device according to claim 14, wherein the screen casting data encoding parameter comprises a data encoding bitrate, resolution and a frame rate, and in the preset screen casting data encoding parameter adjustment strategy, priority of adjusting the data encoding bitrate is higher than at least one of priority of adjusting the resolution or priority of adjusting the frame rate.

16. The electronic device according to claim 14, wherein the at least one program, when executed by the at least one processor, causes the at least one processor to further perform:
    in a case where the current data sending bandwidth is less than the current data encoding bitrate, suspending encoding of the to-be-sent screen casting data until sending of encoded screen casting data in a screen casting data sending buffer queue is completed.

17. The non-transitory storage medium according to claim 9, wherein the computer-executable instruction, when executed by the computer processor, is configured to, before executing receiving the feedback information, further execute:
    adding information content corresponding to a preset data transmission field to TCP header information of the screen casting data, and sending the screen casting data to the target data reception terminal according to a TCP.

18. The non-transitory storage medium according to claim 9, wherein the computer-executable instruction, when executed by the computer processor, is configured to execute determining the data round-trip time of the screen casting data according to the information content of the preset data transmission field in the TCP header information in the feedback information in the following way:
    identifying a first count value and a second count value in the preset data transmission field; and
    in a case where the first count value and the second count value are the same, determining the data round-trip time of the screen casting data according to a sending moment of the screen casting data and a reception moment when the feedback information is received.

19. The non-transitory storage medium according to claim 9, wherein the computer-executable instruction, when executed by the computer processor, is configured to, before executing determining the adjustment strategy for the screen casting data encoding parameter, further execute:

in a process of sending the screen casting data, timing a time for calling a data sending interface and sending the screen casting data to determine screen casting data sending duration; and determining the current data sending bandwidth according to the screen casting data sending duration and a data volume of the screen casting data.

20. The non-transitory storage medium according to claim 9, wherein the computer-executable instruction, when executed by the computer processor, is configured to execute estimating the network bandwidth according to the value change of the data round-trip time, and determining the adjustment strategy for the screen casting data encoding parameter based on the network bandwidth estimation result and the current data sending bandwidth in the following way:

estimating a change degree of the network bandwidth according to a change degree of the data round-trip time; and in a case where the current data sending bandwidth is greater than or equal to a current data encoding bitrate, matching a corresponding preset screen casting data encoding parameter adjustment strategy according to the change degree of the network bandwidth.

* * * * *